United States Patent [19]

Pastor

[11] Patent Number: 5,249,516
[45] Date of Patent: Oct. 5, 1993

[54] MACHINE FOR THE PREPARATION OF FRUIT JUICES

[75] Inventor: Angel F. Pastor, Barcelona, Spain

[73] Assignee: Zumatu, S. A., Bergara, Spain

[21] Appl. No.: 943,911

[22] Filed: Sep. 11, 1992

[51] Int. Cl.⁵ .......................... A23N 1/00; A23N 1/02
[52] U.S. Cl. ...................................... 99/504; 99/495; 99/507
[58] Field of Search ................. 99/495, 496, 501–505, 99/509, 510; 100/98 R, 116, 127, 218, 213; 221/251, 258, 168, 170, 174

[56] References Cited

U.S. PATENT DOCUMENTS

| | | | |
|---|---|---|---|
| 1,888,528 | 11/1932 | Faulds | 99/504 |
| 1,888,529 | 11/1932 | Faulds | 99/502 |
| 2,065,271 | 12/1936 | Faulds | 99/502 |
| 2,274,306 | 2/1942 | Smith | 99/502 |
| 2,354,721 | 8/1944 | Walker et al. | 99/504 |
| 2,602,479 | 7/1952 | Trainor | 99/504 |
| 2,630,849 | 3/1953 | Williams | 99/504 |
| 3,060,984 | 10/1962 | Wurgaft | 99/504 |
| 3,858,500 | 1/1975 | Rohm et al. | 99/509 |
| 4,421,021 | 12/1983 | Holbrook | 99/495 |
| 4,479,424 | 10/1984 | Carroll | 100/98 R |

*Primary Examiner*—Timothy F. Simone
*Attorney, Agent, or Firm*—Abelman Frayne & Schwab

[57] ABSTRACT

A machine for preparing fruit juice has a storage compartment in which the fruit is rack mounted, the machine having a transfer mechanism for removing groups of whole fruit from the storage racks, and then feeding the fruits sequentially to a cutting and juicing mechanism, that mechanism including a stationary blade and a pusher mechanism, for pushing an individual fruit past the blade to divide it into halves, subsequent to which the respective halves are processed in a juice extractor.

8 Claims, 9 Drawing Sheets

MACHINE FOR THE PREPARATION OF FRUIT JUICES

FIELD OF THE INVENTION

This invention refers to a machine for the preparation of fresh fruit juices, especially orange juice.

BACKGROUND OF THE INVENTION

Consumers of fresh fruit juices appreciate juice that is prepared at the very moment of consumption.

Machines known up to now, even if they operate with an acceptable speed, present important inconveniences because of their mechanical complication, the contamination of their elements, and so on.

SUMMARY OF THE INVENTION

The machine of this invention permits a complete cycling of preparing orange juice or other juices, starting from the storage of the whole fruit, transportation of the fruit by a feeding system to a cutting system, means for the guidance of two orange halves toward a juicing head, the squeezing and collecting of the juice, inclusive among these systems being a periodical cleaning of a strainer that receives the juice.

The machine has as its main characteristic great mechanical solidity, which permits high speed operation and fast functioning, which allows very high volume production of juices.

Essentially, the machine of this invention includes a storage system of the whole fruit, in readiness for the preparation of juices, which includes multiple inclined tracks mounted in a frame in the form of a parallellopipedic cage. These tracks terminate in a front part of the machine. Retention hooks for the fruit allow an elevating system to move up and downwardly in front of the hooks, to elevate the oranges from any of the retention hooks towards a higher part of the machine, where unloading of the oranges takes place, subsequent to which the oranges are transferred to a cutting and squeezing system.

A preferred elevating system has a vertical post on which transporting plates are moved to an upper part of the machine, where a tilting system transfers the oranges onto a storage toboggan.

In the guidance and intermediate storage of the oranges on the toboggan, transversal members whose action is combined with the squeezing mechanism hold the fruit, so that for every cycle of squeezing only one fruit at a time is allowed to pass sequentially to the cutting line.

The squeezing system includes two elements in the shape of caps having undulations. Rotatory movement of the caps produces the juice of one half an orange. A little pan receives the half orange and presents it toward a rotatory squeezing cap. The pan accompanies the skin of the orange, after the squeezing, towards a lower part of the machine.

The machine has means to receive the juice that has been squeezed, which passes the juice through a filter to a tub having a float switch to control the level in the tub. The switch starts or switches off the machine, allowing a reserve of freshly squeezed fruit juice to remain in the tub for immediate dispensing of the juice.

The machine has a pump connected on one side with the tub, and connected on the other side with a tap. The pump regulates the dispensing of the juice from the tub, and provides greater homogeneity in the juice, which results in a better taste of the juice.

DESCRIPTION OF THE DRAWINGS

For a better understanding of the invention, and non-limitative example, a machine according to the present invention is shown in the accompanying drawings in which.

DESCRIPTION OF THE PREFERRED EMBODIMENT

The machine includes a storage system for the whole fruits, indicated generally by the arrow 1, which includes a plurality of inclined ramps 2. At their front part, the ramps 2 are provided with retention hooks 3 for holding the leading fruit 4. The storage system is filled up from the rear and has a large capacity of storage, so that the machine can be operated with its own internal supply of fruit for several hours, or even a complete day.

Figure 1:
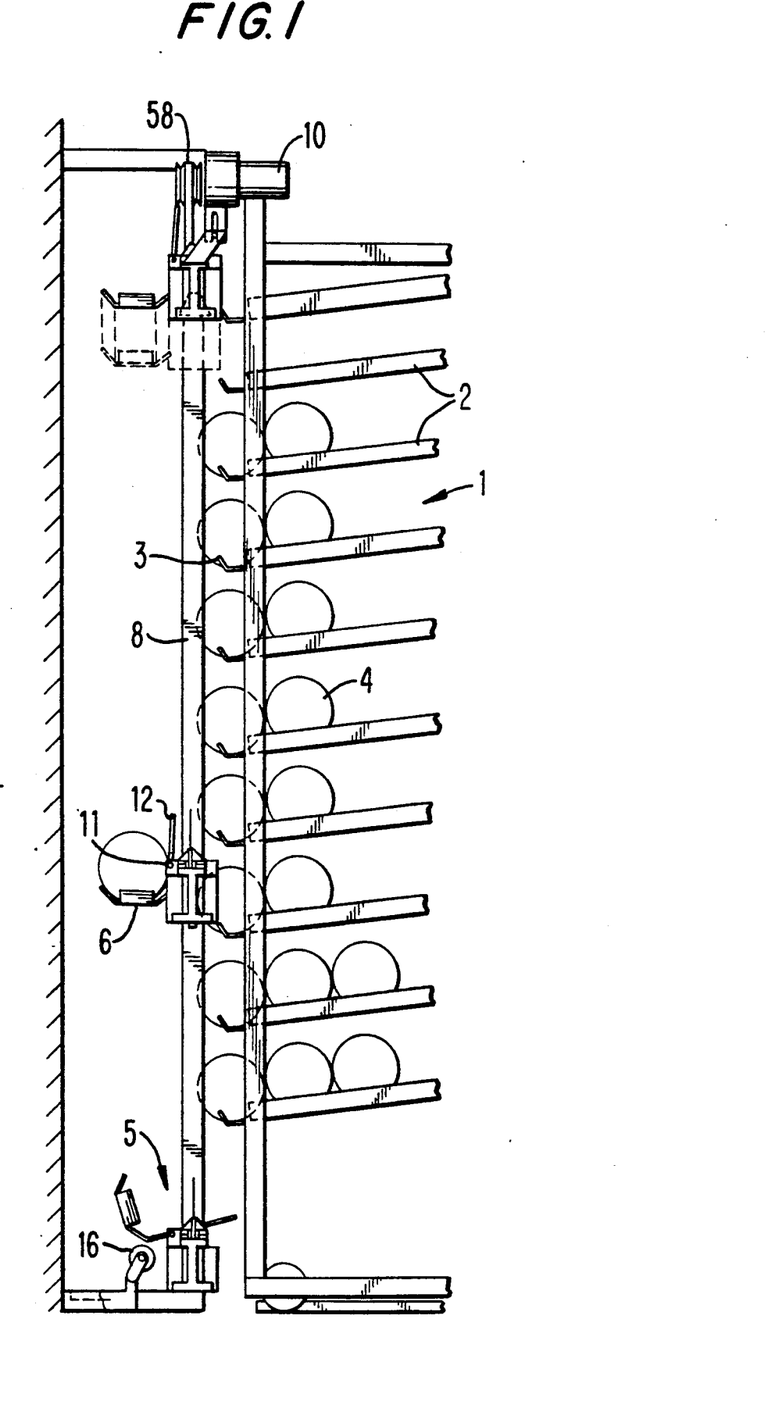
FIG. 1 is a side view of the fruit storage system, and of the elevating mechanism.
Figure 2:
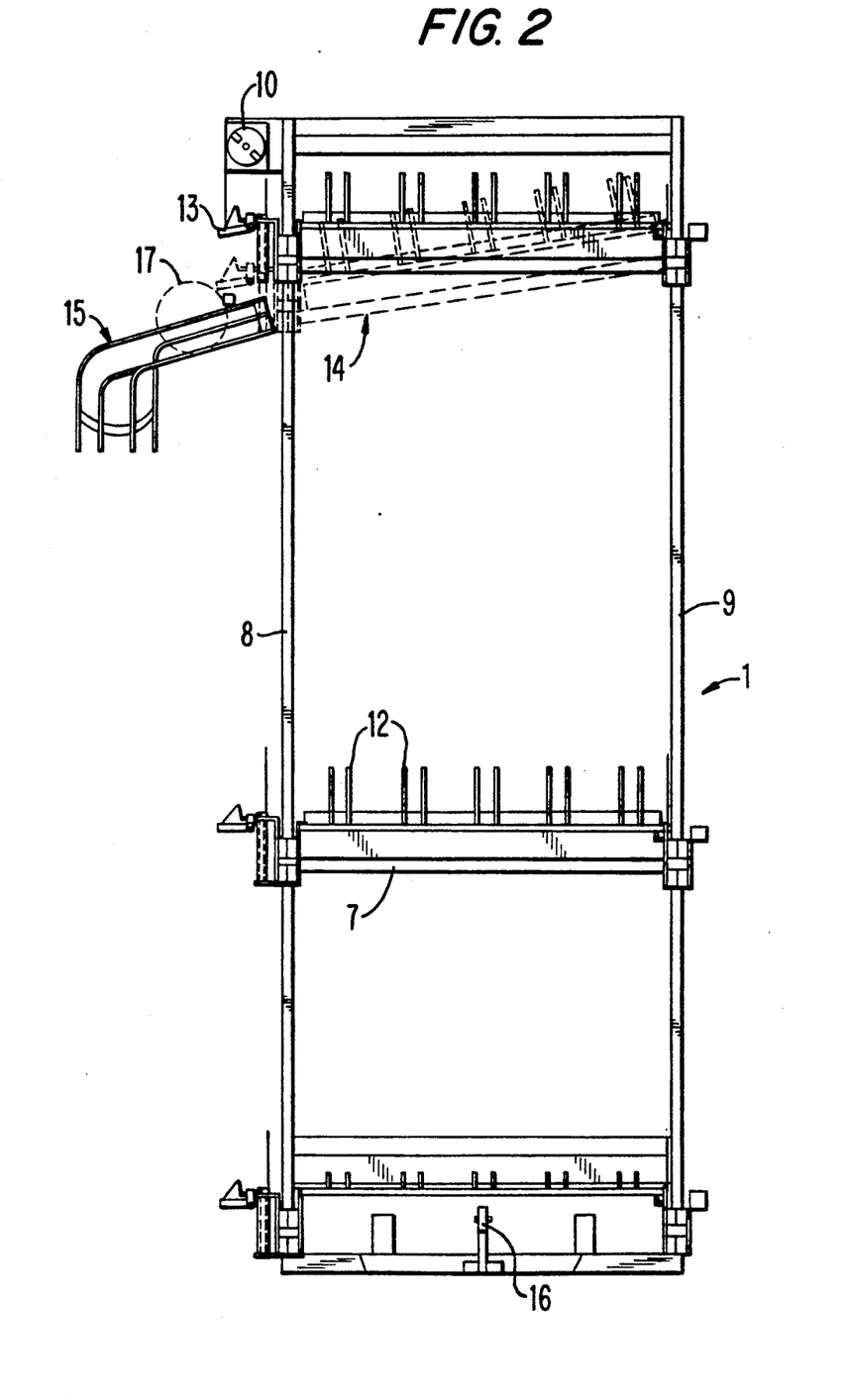
FIG. 2 is a front view of the storage system, showing three different positions of the elevating system.
Figure 3:
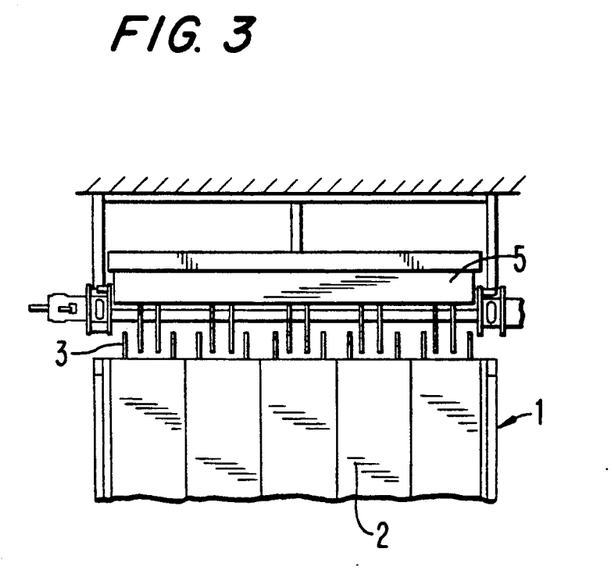
FIG. 3 shows a plan view corresponding to FIGS. 1 and 2.

For withdrawing the fruit from the storage mechanism 4, the machine has an elevating system 5, as shown in FIG. 2. This elevating system includes a carriage 7 that is moved along vertical guides 8 and 9 by a pulley system 58 (FIG. 1) and cables driven by a motor 10a. The elevating system includes a central tilting tray 6 which can rotate around a shaft 11 and which includes a plurality of fingers 12, grouped in pairs, as shown in FIG. 2. The fingers 12 lift individual fruits out of the inclined tracks 4. Owing to the inclined position of the fingers, the oranges are deposited, in the tray 6, causing the tray to tilt, and the fingers 12 to rise, as it is shown at 6a and 12a in FIG. 1. The elevator is then able to rise to the top of the storage mechanism, without any interference with the other lines of oranges.

Figure 4:
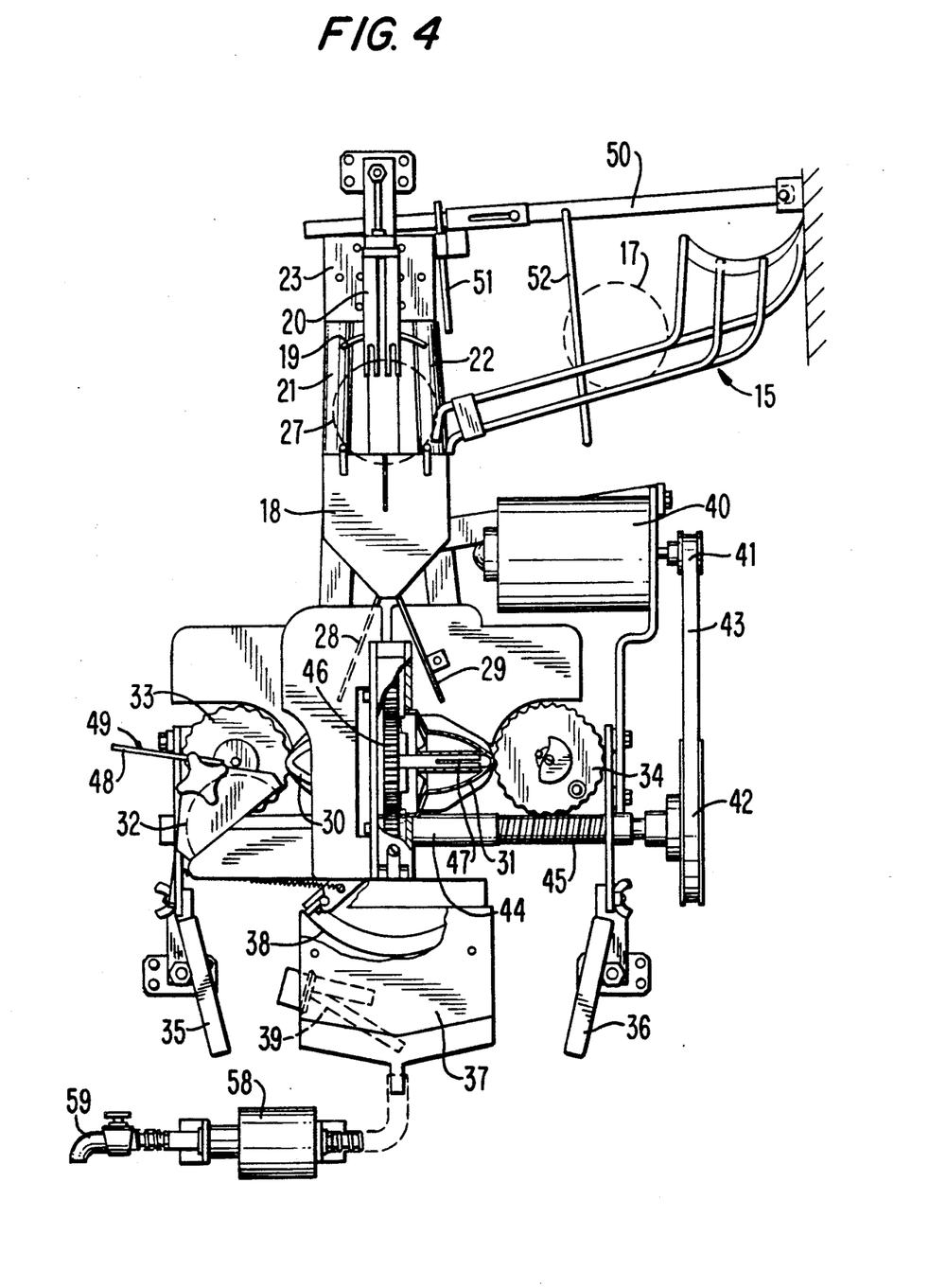
FIG. 4 is a front view of the cutting and squeezing system.

When the elevator reaches the top of the storage system 1, the motor 10 stops automatically through the action of limit switches and a clamp 13 is released so that the carriage 7 can tilt, as it is shown in the dotted position 14 in FIG. 2, allowing the fruit to slide and roll into a toboggan 15, that leads the fruit to a cutting and squeezing device (FIG. 4).

A limit switch 16 automatically stops the elevator when the elevator reaches its lowered position.

Figure 9:
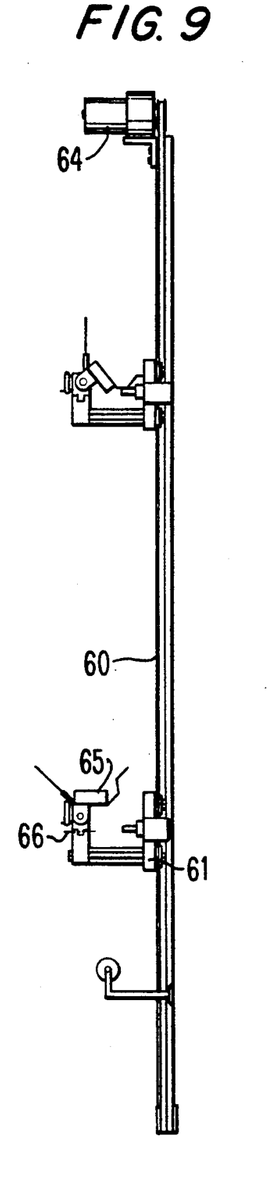
FIGS. 9 and 10 are a side view and front view of a post for the ascending and descending of the supports of the oranges.
Figure 10:
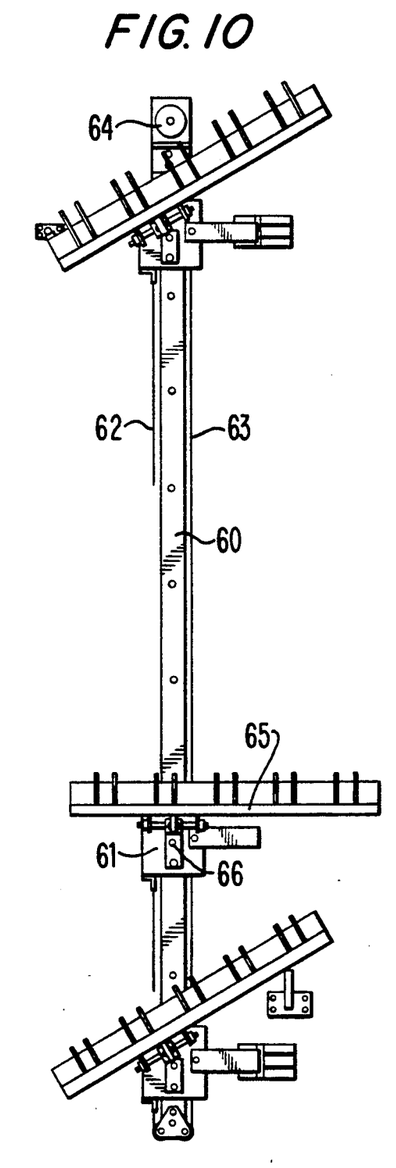
Figure 11:
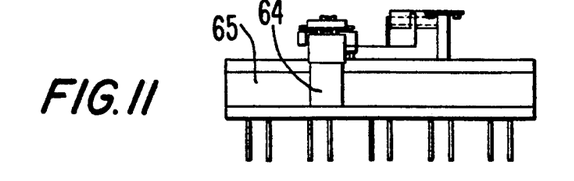
FIG. 11 is a plan view corresponding to FIG. 11.

A preferred elevator is the one illustrated in FIGS. 9, 10 and 11, in which a single vertical post 60A is traversed by a trolley 61 controlled by a line cable 62 and 63 driven by motor 64. The carriages 65 tilt on a pivot 66. A system of fixed or mobile buffers provoke the tilting of the trays.

The tobbogan 15 is formed of a series of bars which direct the individual fruits 17 (FIGS. 2 and 4) towards the cutting and squeezing unit.

Figure 5:
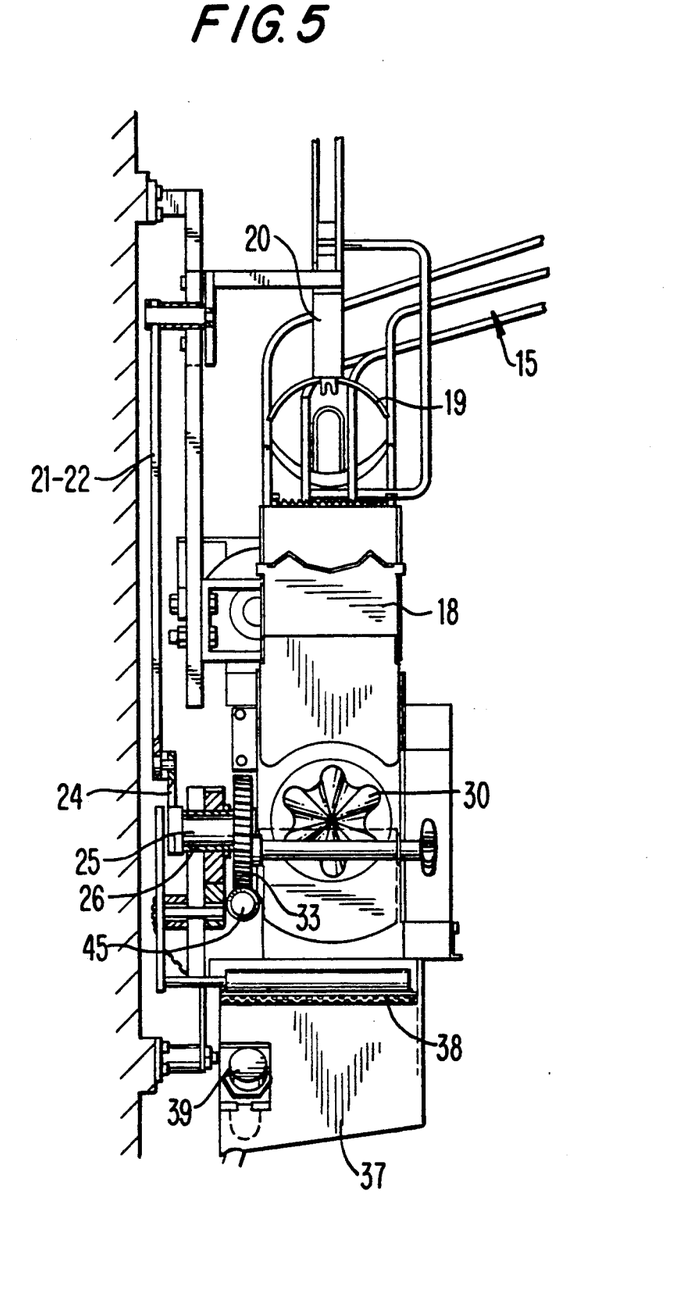
FIG. 5 is a side view of FIG. 4.

A stationary flat blade 18, and an arcuate pusher 19, are mounted on a vertical slide 20 which is moved by connecting rods 21 and 22 that are connected at their top end by a transverse plate 23, and are connected by their lower ends to a crank shaft 24, as shown in FIG. 5. The crank shaft rotates on a horizontal crank 25 mounted in a bearing 26 and by a motor of the machine.

The up and down movement of the slide 20 is transmitted in a compressive action of the pusher 19 to press an orange against the blade 18 to cut the orange into two halves, that are then guided by lateral baffles 28 and 29 to the rotary squeezing caps 30 and 31.

To receive and present the cut half oranges to the squeezing caps 30 and 31, the machine includes several pans 32,one on each side of the machine (only one of which is shown in FIG. 4). The pans have a turning movement on pivots fixed to the helicoidal gears 33 and 34, and receive the cut pieces of fruit and present it to the corresponding squeezing cap during the turning movement of the gears 33 and 34.

Once squeezed, the orange peel is deposited along baffle plates 35 and 36 to a waste bin (not shown).

The juice obtained in the squeezing operation is collected in a lower container 37, through a sieve 38. The container 37 has a constant level control switch 39 that controls the starting or stopping of the machine according to the level of liquid in the container 37.

For the dispensing of juice from the container 37, the machine includes a pump 58 on one side connected with an outlet of the container and on the other side connected with tap 59. The placing of the pump regulates the extraction of the juice from the container and also to realize better homogeneity of this juice.

The driving system of the machine has a main motor 40, which through pulleys 41 and 42, and a belt 43 rotates a central shaft 44 having two sections 45 threaded in inverse directions, of which only one is shown in FIG. 4. From the middle part of the shaft 44 and through a toothed gear, a toothed gear 45 is rotated which carries on shaft 47 the squeezing caps 30 and 31.

The reversely threaded sectors of the shaft 44 drive the helicoidal gears 33 and 34, as can be seen in FIG. 4. These gears 33 and 34 turn in opposite directions, carrying the pans 32. One of the pans 32 is shown in FIG. 4, the gears 33 and 34 also drive the connecting rods 21 and 22 of the pushing member 19, to cut the fruit.

The pans 32 on FIG. 4, are provided with fingers 48, designed to react with a transverse bar 49 to rotate the pan 32 into position for and receiving the next half orange.

The slide 23 of the machine also moves crossbar 50 having fingers 51 and 52, the first of which is much shorter than the second, so that during each complete up and down cycle, a whole fruit 17 is liberated by the fingers 52, and is then held by the fingers 51, after which the fruit is liberated and passes to the cutting zone of the machine.

Figure 6:
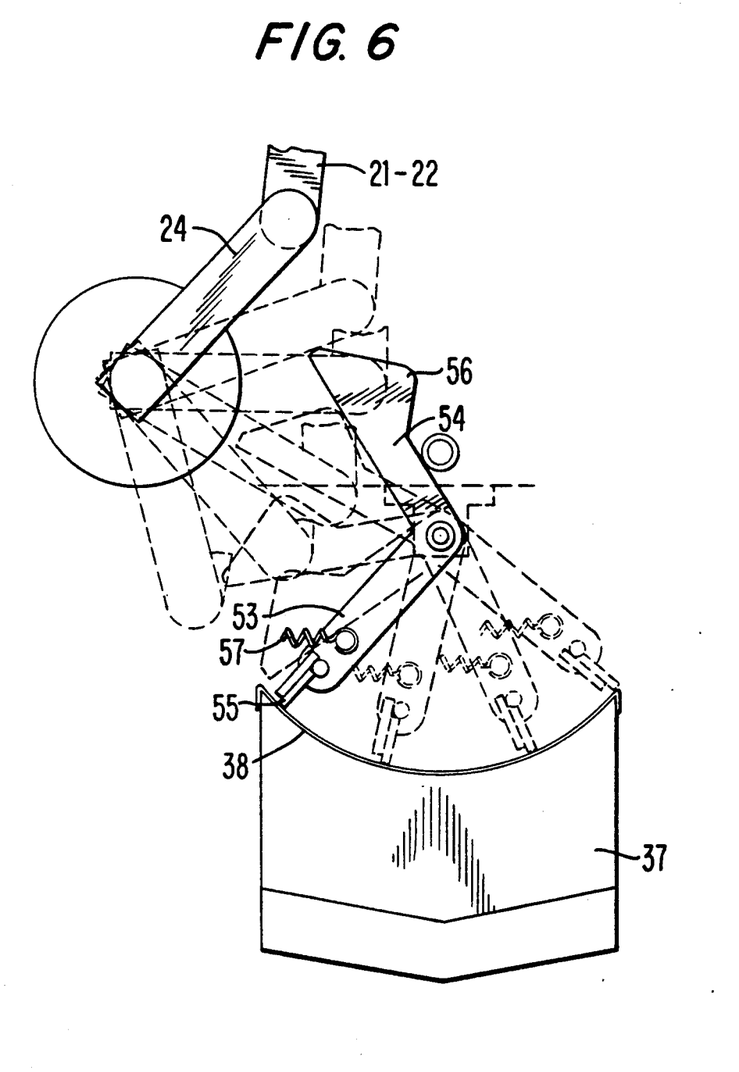
FIG. 6 shows schematically a cleaning system for a sieve that receives the juice.
Figure 7:
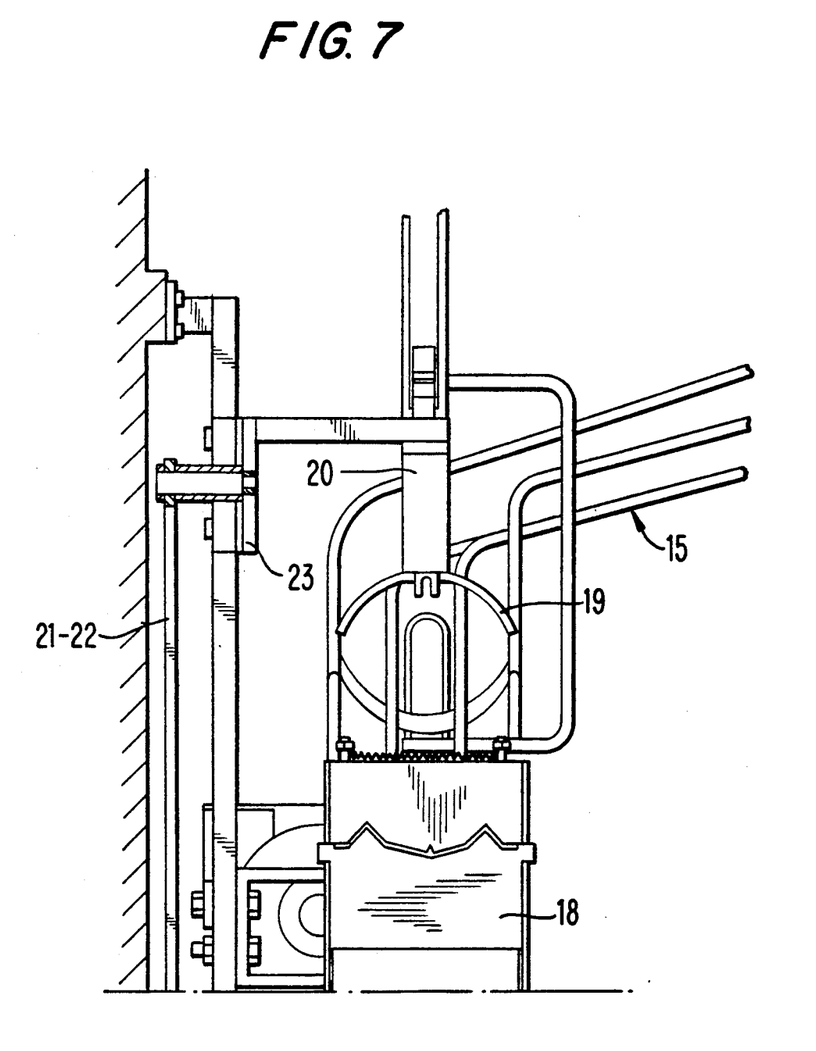
FIG. 7 is a side view of a cutting knife.
Figure 8:
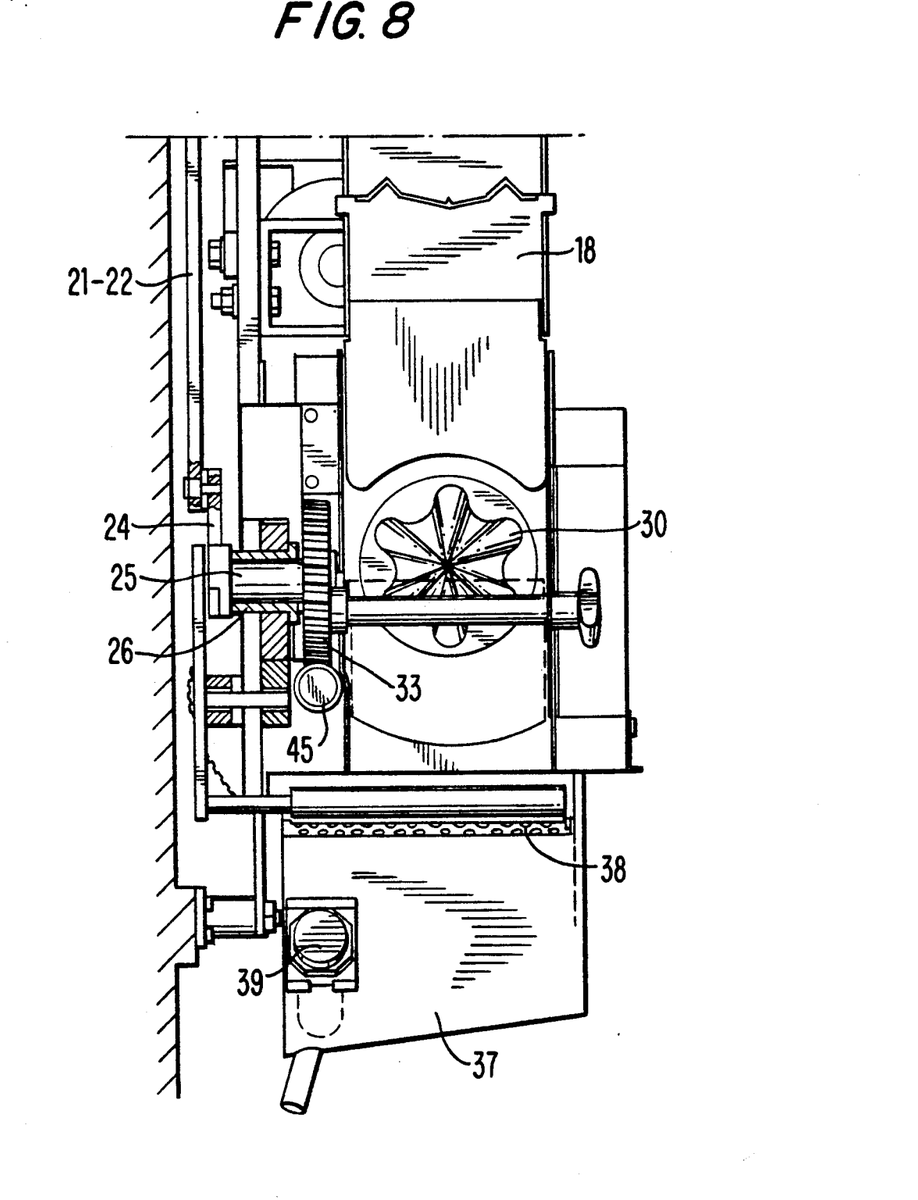
FIG. 8 is a side view of the cutting and squeezing system.

Cleaning of the filtering 38 is done by a crank arm 53 and 54, the crank arm 53 carrying a scraper 55 and the other arm 54 having a cam surface 56 driven by the arm 24 connected to the gear 33. A spring 57 restores the crank arm to its initial position.

The machine of the invention works in a complete cycle, including the storage, transportation, cutting and squeezing functions, in a totally automatic and fast manner.

I claim:
1. A machine for extracting juice from fruit, including:
   a storage section including racks for containing fruit with said fruit arranged in a plurality of serial lines,
   an elevator operative to remove a leading one of said fruits in at least one of said serial lines of said storage section, and to transport said fruit to an upper section of said machine;
   a transfer mechanism at said upper section of said machine operative to assemble fruit transported by said elevator into a serial line;
   a release mechanism for releasing a single fruit sequentially from said transfer mechanism, and, for feeding that single fruit to a cutting mechanism;
   said cutting mechanism including a vertically arranged cutter blade on which said individual fruit is deposited, and a pusher mechanism operative to push said individual fruit downwardly relative to said blade to sever said fruit into halves;
   a juice extracting mechanism operative to receive said fruit halves and extract juice from said respective halves, said machine being operated in timed sequence to produce a succession of juice extractions from successive halves of successive fruits.

2. The machine of claim 1, in which said storage section includes a plurality of horizontal arrays of a plurality of said racks, said horizontal arrays beings arranged in vertically stacked relation, whereby to provide a multiplicity of serial lines of said fruit within said storage section.

3. The machine according to claim 2, in which said elevator includes at least one vertically extending track, a carriage slidably movable along said track, and drive means for moving said carriage between an upper position and a lower position under the control of limit switches.

4. The machine of claim 3, in which said elevator further includes an elongate bin of a length greater than a said horizontal array of said racks, fingers carried by said bin operative to lift a fruit from respective ones of said racks in a said horizontal array of said racks, and to deposit said fruit in said bin, and, pivots supporting said bin at respective ends of said bin for limited pivoting movement under the influence of the weight of said fruit deposited in said bin, from an initial position in which said fingers are operative to remove fruit from said racks, to an overset position in which said fingers are held remote from said racks.

5. The machine of claim 4, including second pivot means permitting pivoting of said bin about an axis transverse to the length of said bin.

6. The machine of claim 1, in which said pusher mechanism is operated in timed sequence with said juice extracting mechanism, said juice extracting mechanism including pans for the reception of a half fruit cut by said cutter blade, subsequent to the cutting of said fruit, for transporting said half fruit to a rotary juice extractor, and then for transporting said half fruit to a disposal container.

7. The machine of claim 1, further including a sieve receiving juice extracted by said juice extracting mechanism, and a movable scraper blade for removing fruit pulp from said sieve, said scraper blade being operated in timed sequence with said juice extracting mechanism.

8. The mechanism of claim 7, including a storage tank receiving juice filtered by said sieve, and pump means operative to dispense filtered juice from said tank.

* * * * *